June 22, 1948.  E. J. HUBER  2,443,769
TOOTH BRUSH STERILIZING TUBE
Filed March 12, 1947  2 Sheets-Sheet 1
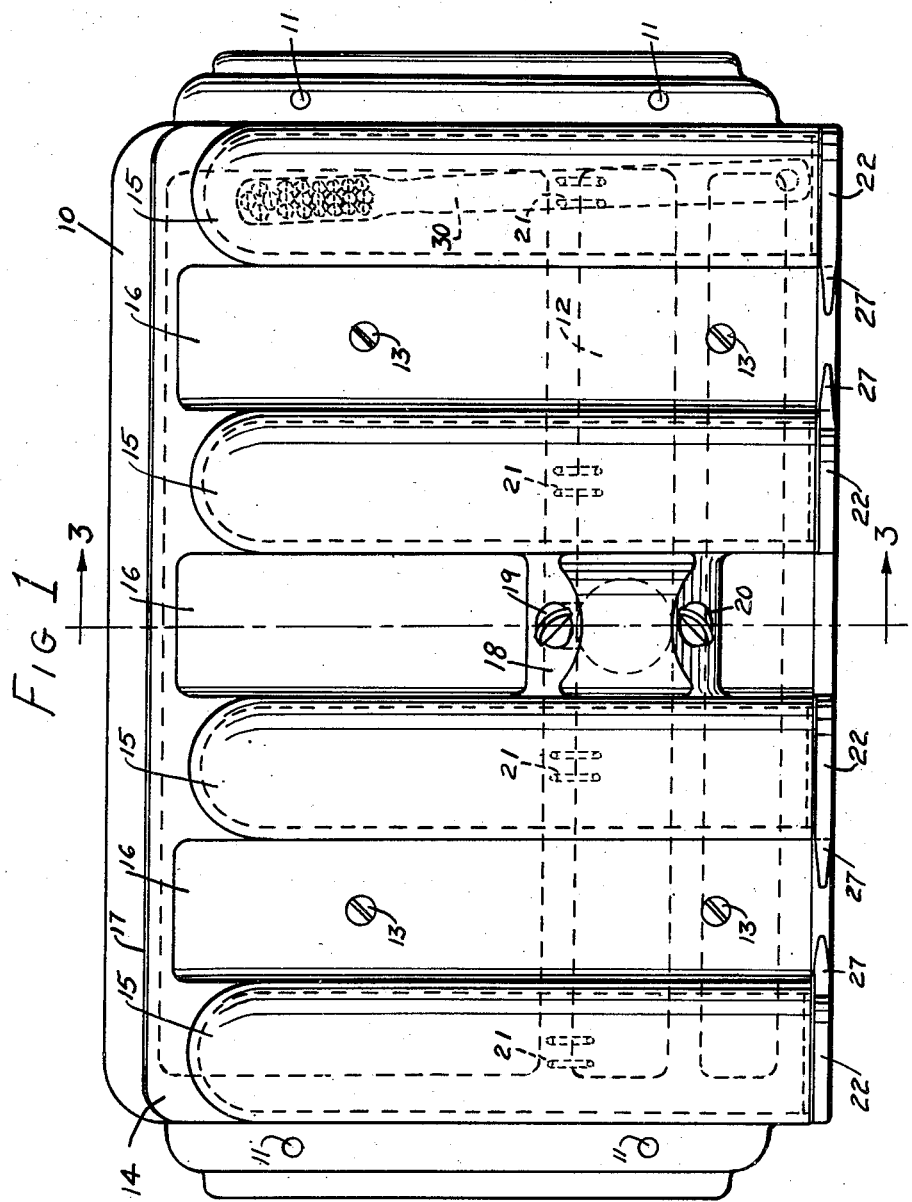
INVENTOR.
EUGENE J. HUBER
BY *Victor J. Evans & Co.*
ATTORNEYS June 22, 1948.     E. J. HUBER     2,443,769
TOOTH BRUSH STERILIZING TUBE
Filed March 12, 1947     2 Sheets-Sheet 2
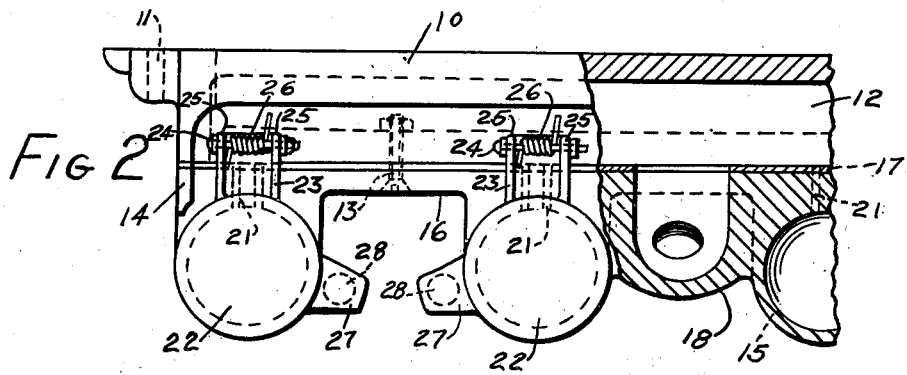
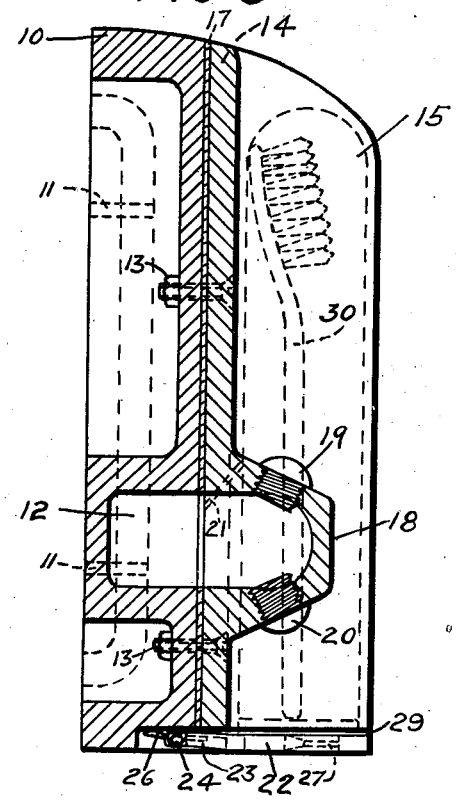
INVENTOR.
EUGENE J. HUBER
BY *Victor J. Evans & Co.*
ATTORNEYS Patented June 22, 1948

2,443,769

UNITED STATES PATENT OFFICE 2,443,769

TOOTHBRUSH STERILIZING TUBE

Eugene J. Huber, New Orleans, La.

Application March 12, 1947, Serial No. 734,137

1 Claim. (Cl. 21—83)

This invention relates to a tooth brush sterilizer and retainer and the primary object of the invention is to provide a device of this character that will sterilize a number of brushes at the same time, without the brushes being in contact with each other.

Another object of the invention is to provide a device of this character that is compact, simple to operate, efficient to use and economical to manufacture.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention;

Figure 2 is a bottom plan view thereof partly in section and

Figure 3 is a sectional view on the line 3—3 of Figure 1.

Referring more in detail to the drawings, the reference numeral 10 designates the mounting base of the sterilizer embodying the invention, which is provided with openings 11 at the opposite ends thereof, whereby the base is mounted on a wall or other suitable support.

Extending longitudinally of the base 10 is a compartment or tank 12 which is adapted to hold a germicidal preparation. Secured to the base plate 10 by fasteners 13 is the face plate 14 provided with the tubular container 15 for holding tooth brushes or the like. The containers are relatively spaced from each other by depressed areas 16, through which the fasteners 13 extend, and a gasket 17 is interposed between the base 10 and plate 14, to provide a seal for the compartment 12, and the filling and drainage bowl 18, as well as each compartment. The base 10 and plate 14 are made from glass or transparent plastic, and if these two are molded as a unit, the gasket 17 can be eliminated.

The bowl 18 is provided with a filling plug 19 and a drainage plug 20, and the bowl 18 communicates with the compartment 12, as shown in Figure 3. Each container 15 is provided with a pair of downwardly inclined openings 21 which communicate with the compartment 12 so that fumes from the germicidal preparation will pass therefrom into the containers. The lower ends of the openings 21 extend below the level of the preparation in the container, while the upper ends are above the compartment level. Therefore, germs cannot pass from one container to another without passing through the compartment 12, and the preparation therein. Thus all germs will be destroyed before they can contaminate the brushes in each of their respective containers.

Each container 15 is open at its respective bottom, and the open bottom of each container is closed by a closure 22 which is provided with apertured ears 23 whereby the closures are hinged to the plate 14 by pin bolts and nuts 24 mounted in apertured ears 25 on the plate 14, and a spring 26 tensions each closure to maintain it in contact with the open bottom of its respective container 15.

A projection 27 on each closure is provided, so that if a person's finger is placed thereon and pressed downward, the closure can be opened to remove or insert a tooth brush into each container, a depression 28 being formed in the projection to rest the tip of the finger therein.

Each of the closures is provided with a gasket 29 to provide a seal for the open bottom of the container and closure.

Each tooth brush 30 is retained in its individual container, access to which is obtained by opening the closure 22 to each container as previously described. Fumes passing into the containers from the compartment 12 will destroy all germs on the brushes, and the containers will be properly sterilized for a period of several months. Thus the brushes are retained in their respective containers in a sterilized condition, protected from contamination by germ carrying insects, dust or similiar items having germ carrying properties.

There has thus been provided, a device which will accomplish the objects of the invention, and it is believed that from the foregoing description, the operation and construction of the device will be apparent to those skilled in the art. It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising a base plate, a face plate secured to said base plate, tubular containers carried by said face plate, a compartment for a germicidal preparation in said base plate, communicating openings between said compartment and said containers to permit fumes from the preparation to enter said containers, spring pressed closures for said containers, a gasket between said plates to provide a gas and liquid tight seal, and a filling and drainage bowl on said face plate having communication with said compartment.

EUGENE J. HUBER.

REFERENCES CITED

The following references are of record in the file of this patent:

UNITED STATES PATENTS

| Number | Name | Date |
|---|---|---|
| 1,981,383 | Feldon | Nov. 20, 1934 |